United States Patent [19]
Thurber, Jr. et al.

[11] Patent Number: 4,730,793
[45] Date of Patent: * Mar. 15, 1988

[54] ORDNANCE DELIVERY SYSTEM AND METHOD INCLUDING REMOTELY PILOTED OR PROGRAMMABLE AIRCRAFT WITH YAW-TO-TURN GUIDANCE SYSTEM

[75] Inventors: Charles H. Thurber, Jr.; Frederick A. Behrens, both of Springfield; John H. Hunton, Annandale, all of Va.

[73] Assignee: E-Systems, Inc., Dallas, Tex.

[*] Notice: The portion of the term of this patent subsequent to Jul. 23, 2002 has been disclaimed.

[21] Appl. No.: 566,163

[22] Filed: Jan. 26, 1984

Related U.S. Application Data

[63] Continuation of Ser. No. 292,260, Aug. 12, 1981, Pat. No. 4,530,476.

[51] Int. Cl.⁴ .................. F41G 7/00; F42B 15/053
[52] U.S. Cl. ............................ 244/3.1; 89/1.801
[58] Field of Search ............... 244/3.1, 3.15, 3.21, 244/76 R, 117 R, 119, 120, 171–181, 184; 89/1.801, 1.804, 1.805

[56] References Cited

U.S. PATENT DOCUMENTS

| | | | |
|---|---|---|---|
| 1,663,058 | 3/1928 | Peppin | 244/3.1 |
| 2,603,434 | 7/1952 | Merrill | 244/3.21 |
| 2,824,710 | 2/1958 | Hall | 244/3.21 |
| 4,202,516 | 5/1980 | Benser | 244/3.15 |
| 4,296,894 | 10/1981 | Schnäbele et al. | 244/3.1 |
| 4,371,939 | 2/1983 | Adams et al. | 244/179 |
| 4,392,203 | 7/1983 | Fischer et al. | 244/177 |
| 4,410,151 | 10/1983 | Höppner et al. | 89/1.801 |

Primary Examiner—Charles T. Jordan
Attorney, Agent, or Firm—Albert M. Crowder, Jr.

[57] ABSTRACT

A method and system for delivery ordnance to a target via a remotely piloted or programmable aircraft including a yaw-to-turn guidance system, a deployment and launching system and packaging for the aircraft are disclosed.

19 Claims, 18 Drawing Figures

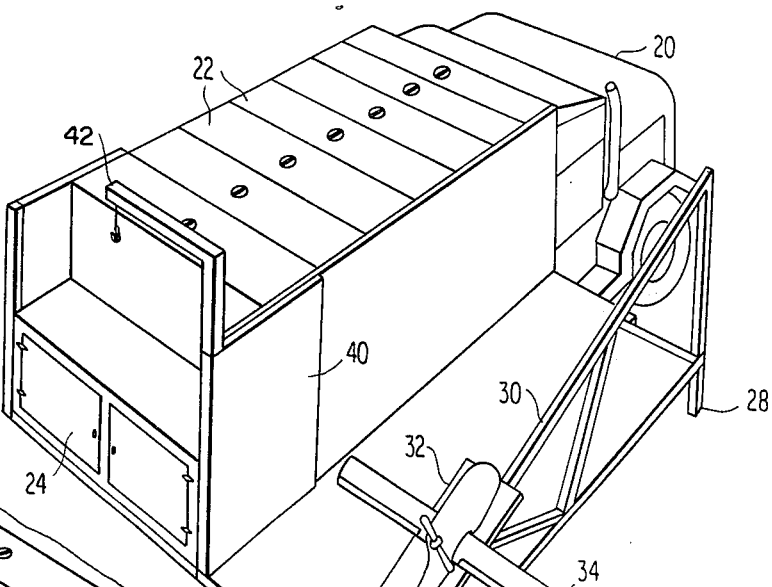
FIG. 1
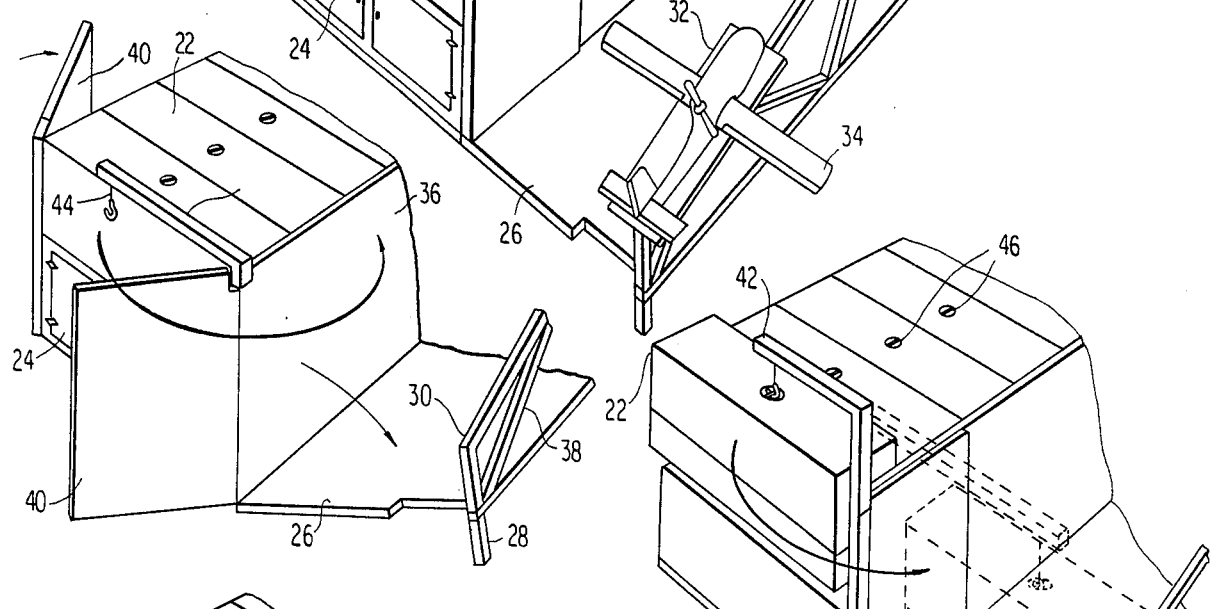
FIG. 2
FIG. 3
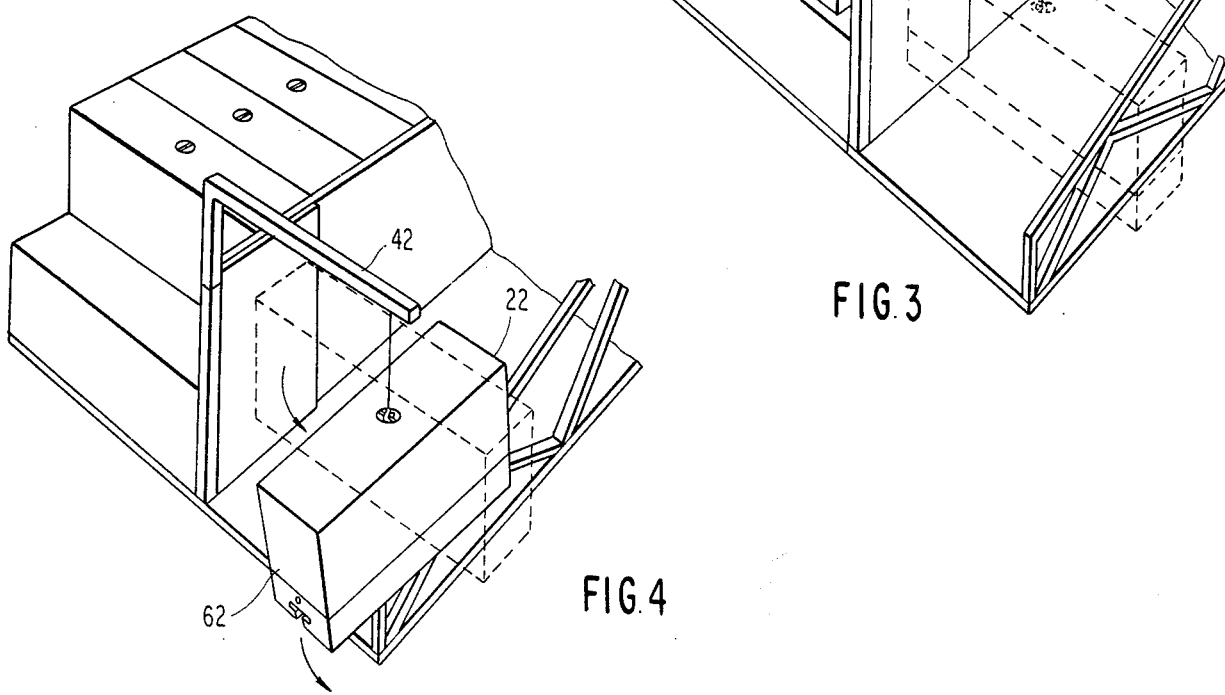
FIG. 4

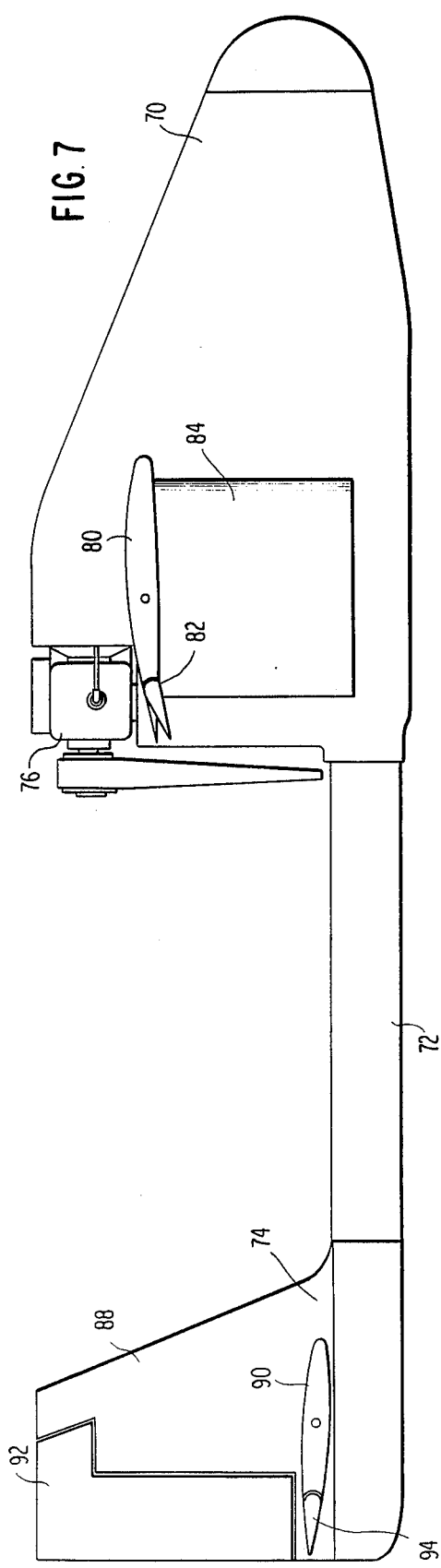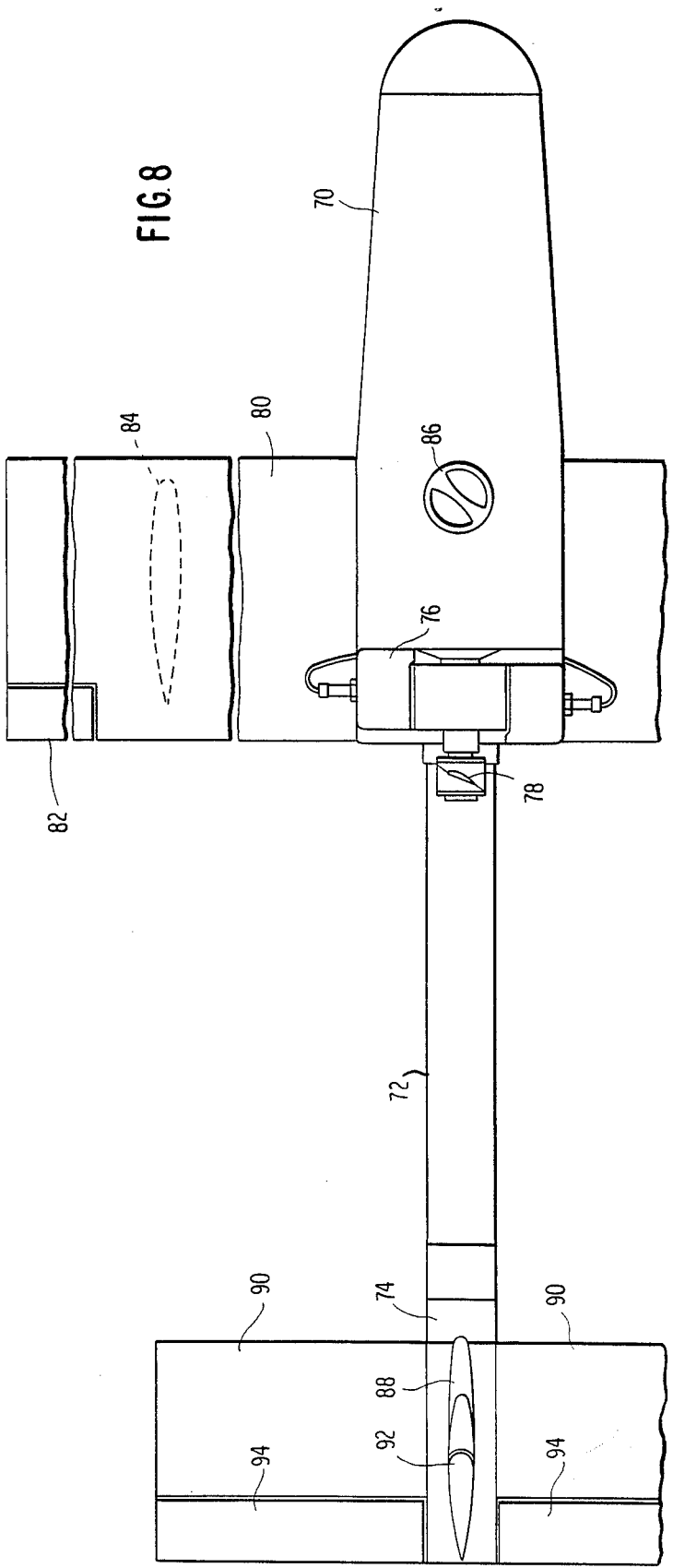

ORDNANCE DELIVERY SYSTEM AND METHOD INCLUDING REMOTELY PILOTED OR PROGRAMMABLE AIRCRAFT WITH YAW-TO-TURN GUIDANCE SYSTEM

This is a continuation of application Ser. No. 292,260, filed Aug. 12, 1981, now U.S. Pat. No. 4,530,476.

BACKGROUND OF THE INVENTION

Expendable remotely piloted or programmable aircraft are well known. They are generally designed to fly to a predetermined area, to detect and to home on an enemy ground target, typically utilizing electromagnetic wave energy radiating from the target for guidance. Because such expendable aircraft require a long flight endurance, a conventional aircraft configuration is necessitated.

In the terminal guidance of such aircraft, the electromagnetic radiation sensors generally determine the angles and/or angle rates between the targets and the longitudinal axis of the aircraft in both the pitch and yaw planes. Pitch errors are generally corrected by rotating the aircraft in the pitch plane using the elevators in both "pursuit" and "proportional" guidance systems. Minimum cross coupling of motion results in the yaw plane because aircraft are generally symmetrical about the pitch plane, i.e., have equal area control surfaces on both sides of the longitudinal axis of the aircraft.

However, conventional aircraft generally cannot generate sufficient side force to change the velocity vector of the aircraft in the yaw plane. Thus, it is necessary to roll the aircraft about its longitudinal axis into the direction of the turn, and to use the horizontal component of the lift vector from the aircraft wings to turn the aircraft in the yaw plane. With a sensor fixed to the body of the aircraft, any roll about the longitudinal axis of the aircraft creates apparent errors in both pitch and yaw angles and pitch and yaw rates of change. Such errors may be significant in magnitude and may result in polarity shifts resulting in oscillation, divergence, and in mission failure. For these reasons, it is necessary to use a roll compensation circuit to calculate from the angles and rates measured by the aircraft the pitch and yaw angles and rates of change as a function of roll rate or change or in the attitude of the aircraft from a wings level or horizontal attitude. Even with roll compensation circuitry, the time lag necessarily introduced by rolling the aircraft to correct yaw errors creates a larger circular error probability than is desired.

Another problem in conventional systems is the use of a vertical gyro. Vertical gyros are very expensive. As is well known, vertical gyros become less sensitive when approaching gyro gimbal nadir or true vertical and, thus, use of a vertical gyro for roll reference limits the aircraft to shallow dive angles with the inevitable larger miss probability distances due to the geometry of such dives. Terrain blocking is also a significant possibility. If true nadir is reached, the vertical gyro cannot sense roll angle and the roll loop circuit of the guidance system may become unstable Still another problem is sensor accuracy. It has been a practice generally to use extremely accurate sensors so as to avoid compounding of the inaccuracies of the roll compensation circuitry with its vertical gyro.

Yet a further problem in the use of expendable remotely piloted or programmable aircraft has been the need for rapid deployment and for rapid erection when on the desired site for launching. Among the difficulties faced in such deployment is the need for storage of fuel, ordnance, and the launch rocket separately from each other and from the aircraft for obvious safety considerations.

It is accordingly an object of the present invention to obviate these and other deficiencies of known expendable remotely piloted or programmable aircraft and to provide a novel method and system.

It is another object of the present invention to provide a novel method and system in which the homing performance of an expendable remotely piloted or programmable aircraft is significantly enhanced through the elimination of rolling turns for yaw corrections during the terminal dive maneuvers.

It is still another object of the present invention to provide a novel method and guidance system for an expendable remotely piloted or programmable aircraft which eliminates the cost and complexity of roll compensation circuitry, requires less accurate sensors than conventional roll-to-turn systems, and eliminates expensive components such as vertical gyros.

It is yet another object of the present invention to provide a novel method and system for crating and for uncrating an expendable remotely piloted or programmable aircraft.

Another object of the present invention is to provide a novel method and system for rapidly and safely deploying and launching expendable remotely piloted or programmable aircraft.

Still another object of the present invention is to provide a novel expendable remotely piloted or programmable aircraft which is compact when crated yet rapidly erected.

These and many other objects and advantages of the present invention will be apparent from the claims and from the following detailed description when read in conjunction with the appended drawings.

THE DRAWINGS

FIG. 1 is a pictorial view of one embodiment of the system of the present invention;

FIGS. 2-4 are pictorial views illustrating the method of loading the aircraft on the launching rail;

FIG. 7 is an elevational view of one embodiment of the aircraft of the present invention;

FIG. 8 is a top plan view of the aircraft of FIG. 7;

THE DETAILED DESCRIPTION OF A PREFERRED EMBODIMENT

Figure 5:
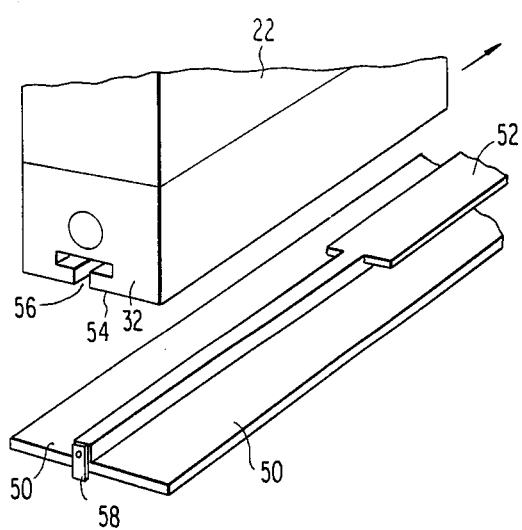
FIG. 5 is a pictorial view illustrating the mating of the base member of the aircraft crate with the launching rail.

One embodiment of the deployment system of the present invention is pictorially illustrated in FIG. 1 wherein a truck 20 or other suitable wheeled vehicle is configured with a storage area for a plurality of crates 22 for the expendable pilotless or programmable aircraft. The truck 20 may include storage means 24 for electrical cables, programming means, and the like. A loading means indicated generally at 42 is desirably carried for the handling of the crates 22.

The truck 20 may also be provided with launching means including a platform 26 supported at its outer extremities by conventional folding or telescoping hydraulically operating legs 28. This platform 26 may be used to support a launching rail 30 on which the base member 32 of one of the crates 22 may be slidably mounted.

One embodiment of the aircraft 34 of the present invention is retained on the base member 32 for launching from the rail 30. In this way, the crated aircraft of the present invention may be rapidly deployed by truck to a desired launching site, a crate loaded onto the launching rail, the crate removed, the aircraft erected, fueled, armed and programmed, and the base member of the crate launched with the aircraft. As will be subsequently explained in greater detail, the base member 32 will fall away from the aircraft 34 once the launch has been completed, and the aircraft will continue on its mission pursuant to a programmable flight controller.

The method of setting up for launch of the aircraft may be more easily understood by reference to FIGS. 2 through 5 where like components have been accorded like numerical designations consistent with the illustration of FIG. 1. As shown in FIG. 2, the first step involved in the setting up for the launching operation may be the pivoting of the platform 26 from its storage area alongside the side 36 of the truck 20 downwardly into a generally horizontal posture. The legs 28 at the outer edge of the platform 26 may be swung downwardly to provide support. This action places the launching rail 30 in an inclined position suitable for launch of the aircraft 34. The launching rail 30 and its supporting members 38 are desirably rigidly secured to the platform 26 and no independent set up is required. In addition to providing a level platform from which to erect, fuel, arm and program the aircraft, the rail overlies the crated aircraft 22 when the truck 20 is used for transportation purposes.

The next step is the pivoting of the two doors 40 at the rear of the truck 20 to an open position alongside the sidewalls 36 of the truck thereby giving access to the storage areas 24 at the rear of the truck and also providing swinging room for the boom 42 of the handling means.

The handling of the crated aircraft 34 may be by any suitable conventional means, and in the illustrated embodiment, is handled by the elevation of the boom 42 from the position shown in FIG. 2 to the position shown in FIGS. 1, 3 and 4. A block and tackle with a hook 44 may be adjusted along the length of the boom 42. Thus, the boom 42 may be swung into position over a crate 22 and the hook 44 secured to a suitable conventional receptacle 46 at the top of each of the crates 22. The boom 42 may then be pivoted to the position illustrated in FIG. 3 and the crated aircraft rotated 90 degrees into the position illustrated in FIG. 4.

Figure 9:
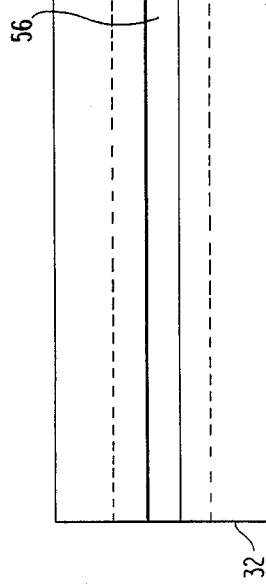
FIG. 9 is a bottom view of the crate of the present invention.

The launching rail desirably takes the configuration illustrated in FIG. 5. With reference to FIG. 5, the rail may be provided with a wide flat surface 50 on either side of a T-shaped raised rail 52. The flat surfaces 50 are suitable for contact with the lower surfaces 54 of the base member 32 of the crates and provide lateral stability for the base member 32 during the launch. As shown in greater detail in FIGS. 6 and 9, the base member 32 of the crate 22 is desirably configured with a T-shaped slot 56.

From the crate position illustrated in FIG. 4, the slot 56 of the crate at the front end thereof may be mated with the T-shaped flanges 52 of the rail and the crate 22 lowered to a position atop the rail 30 resting on the surfaces 50 thereof. Once in this position, the crate may be slid forward slightly and a suitable conventional fastener such as the stop 58 rotated into position to prevent the sliding of the crate 22 rearwardly from the rail.

One embodiment of the aircraft of the present invention is illustrated in FIGS. 7 and 8. With reference to FIGS. 7 and 8, the aircraft of the present invention includes a nose section 70, an elongated central section 72 and a tail section 74. The central section 72 is desirably of tubular construction. The nose section 70 may be aerodynamic in shape and contains the guidance system and its flight profile controller, a sensor, an ordnance receptacle, a fuel tank receptacle, and an air cooled internal combustion engine 76 to which may be mounted a suitable conventional pusher propeller 78. As shown in FIG. 7, the pusher propeller may include only a single blade. The single bladed propeller has been found desirable because the use thereof obviates delays inherent in the attachment of the propeller to the aircraft engine. While a two bladed one may be utilized, in the embodiment illustrated in FIGS. 7 and 8 a two bladed propeller must be removed from the engine 76 while the aircraft is in the crate and attached thereto at the time of launch.

Extending laterally from the nose portion 70 of the aircraft are a pair of wings 80 having movable ailerons 82 at the outer extremities thereof. Depending from each of the wings 80 is a side thrust generator 84, used, as will be explained hereinafter in greater detail, in operating the aircraft in a yaw-to-turn mode in at least the terminal dive of the aircraft. The ordnance may be inserted into the nose portion 70 by removing of the screw cap 86 or other suitable cover means for an ordnance receiving recess.

With continued reference to FIGS. 7 and 8, the tail section 74 includes a vertical stabilizer 88 from which extend two horizontal stabilizers 90. The vertical stabilizer 88 is provided with a movable rudder 92 and the horizontal stabilizers are provided with elevators 94.

Figure 6:
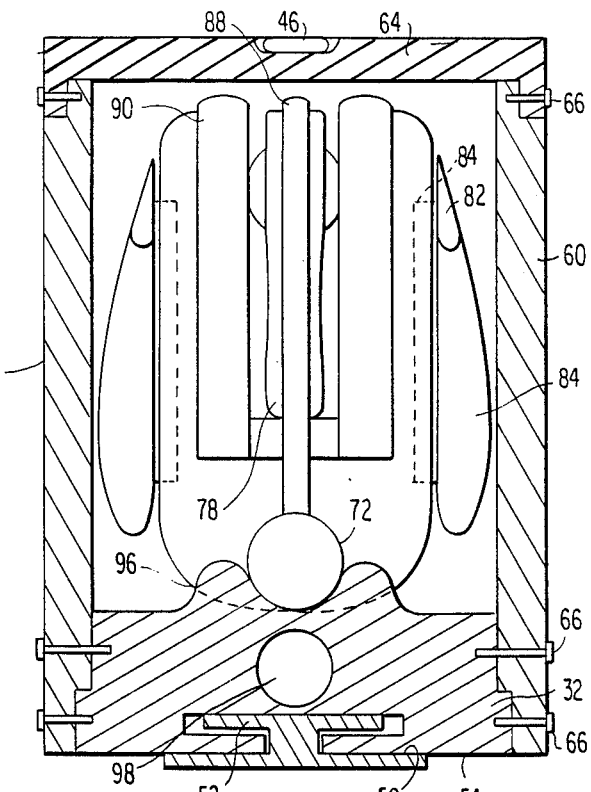
FIG. 6 is a rear elevational view of the crate of the present invention in cross section with the aircraft of the present invention stored therein.
Figure 10:
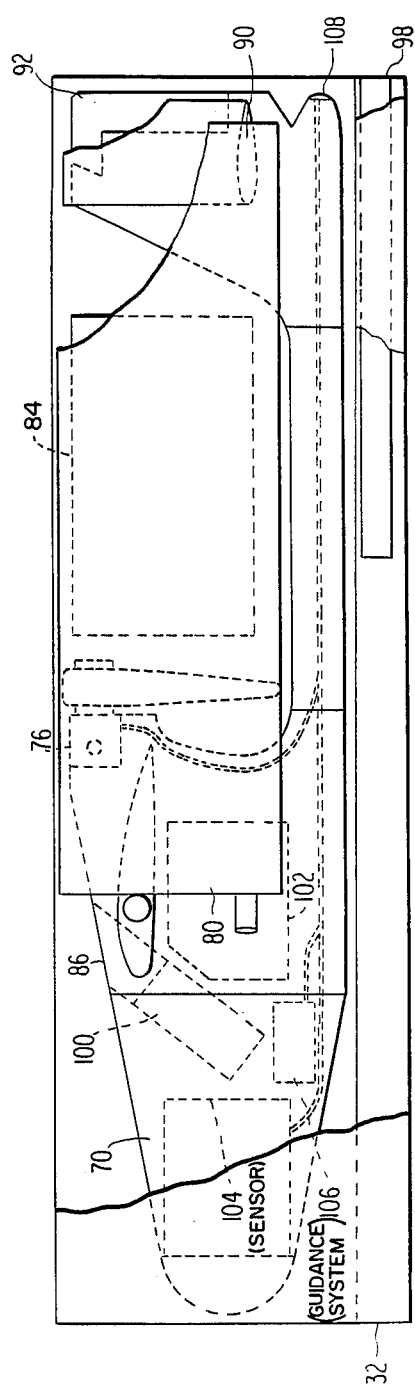
FIG. 10 is an elevation of the crate of the present invention in partial sections showing the aircraft of FIGS. 7 and 8 stored therein.
Figure 11:
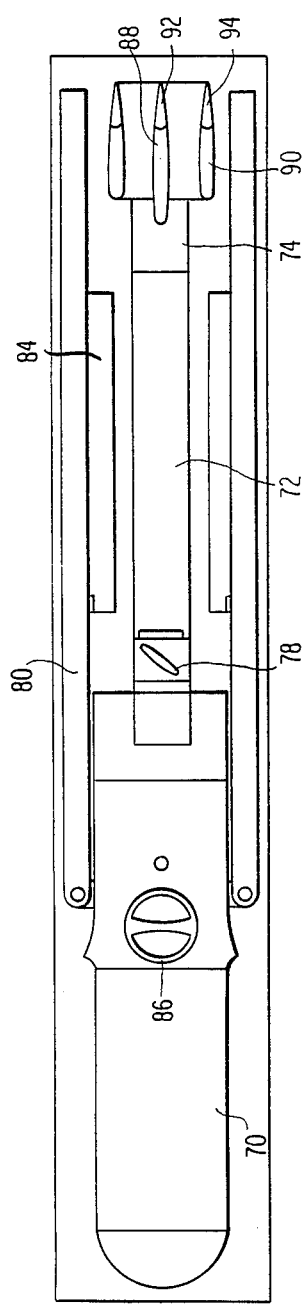
FIG. 11 is a top plan view of the crate of the present invention with the top removed and the aircraft of FIGS. 7 and 8 stored therein.

This aircraft, as illustrated in FIGS. 7 and 8, may be packed within the crates 22 of FIG. 1 substantially as illustrated in FIG. 6, 10 and 11. With reference to FIG. 6, the base member 32 of the crate 22 may be provided with a suitable conventional support means 96 adapted to support the aircraft on the base member 32 and to maintain it in that position throughout the launch. As shown in FIGS. 6 and 10, the base member 32 is desirably provided with a rocket receiving recess 98 extending from the rear of the base member 32 forward along essentially the longitudinal axis thereof.

As shown more clearly in FIG. 10, the screw cap 86 for the ordnance recess 100 may be removed to permit the insertion of the ordnance into the nose portion 70 of the aircraft. As earlier described, the nose portion 70 may also contain a fuel cell receiving recess 102, a sensor 104 and a guidance system 106.

The sensor 104, the guidance system 106 and the engine 76 may be electrically powered for start up by way of an external rapid connect/disconnect plug 108 at the rearmost portion of the aircraft. As will be later explained in greater detail, the plug 108 may also be used to program the flight profile controller within the guidance system 106 immediately prior to launch of the aircraft.

The position of the aircraft within the crate 22 may be understood more clearly with reference to FIGS. 6, 10 and 11.

Once the crate is in place on the rail, the top panel, the upright side panels 60 illustrated in FIG. 6 and the upright end panels 62 shown in FIG. 4 may be removed. The side and end panels may be separated from the top panel 64 and removed from the base member 32 separately, or as a single unit using the boom 42 and the hoist associated therewith. Suitable conventional quick connect-disconnect fasteners 66 may be utilized to secure the various panels of the crate together. In the preferred embodiment illustrated in FIG. 6, the operation of the quick disconnect fasteners 66 connecting the side panels to the base member, e.g., by one quarter turn rotation, may permit the lifting of the entirety of the crate from the base member 32 as a single unit. In a second embodiment (not illustrated) the top, end and side panels are constructed as a single unit out of moisture impervious material and provided with a suitable seal where it mates with the base member.

Figure 12:
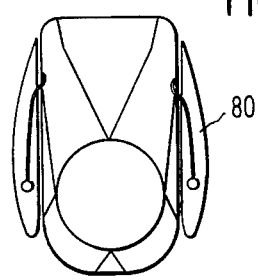
FIGS. 12-16 illustrates the method of erecting the embodiment of the aircraft of FIGS. 7 and 8.

The erection of the aircraft once the top, end and side panels of the crate 22 have been removed may be understood more clearly with reference to FIGS. 11 through 15. As shown in FIG. 12, the wings 80 of the aircraft are stored in a position substantially alongside the aircraft. By way of the unique assembly shown in FIG. 13, the wing may be stored in a position displaced from the ultimate mounting position.

Figure 13:
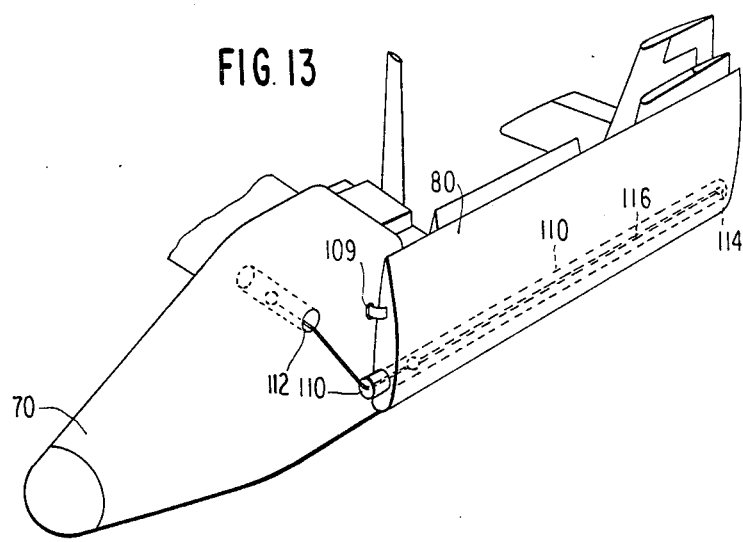
Figure 14:
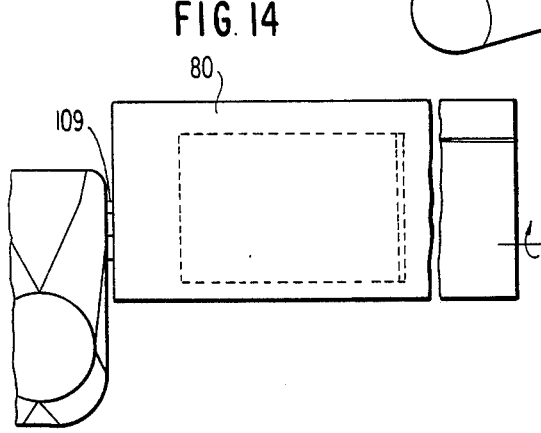

As illustrated in FIGS. 13 and 14, the wing 80 may be provided with a hinge 109 and a cylinder 110 extending into the wing. This cylinder 110 is adapted to mate with a recess 112 in the nose portion 70 of the aircraft. An elastic or "bungee" cord 116 is connected to the far end 114 of the cylinder 110 and extends out of the end of the cylinder 110 and into the recess 112. Thus, the entire wing may be lifted slightly from the position illustrated in FIG. 12, rotated into a position normal to the longitudinal axis of the aircraft, and the cylinder 112 inserted into the recess 112. The elasticity of the bungee cord serves not only to assist in retaining the wing in position, but also serves a guiding function which facilitates the rapid mating of wing to aircraft.

Once the wings are in the position illustrated in FIG. 13, they may be rotated about the axis of the cylinder 110 into a horizontal position as shown in FIG. 14. Once in a horizontal position, the side thrust generators 84 may be pivoted downwardly from the position illustrated in FIG. 14 into the position illustrated in FIG. 15.

In lieu of a simple hinge arrangement illustrated in FIG. 14, the connection between the side thrust generators 84 and the wings 80 may be of the type described in connection with the wing erection illustrated in FIG. 12. Suitable conventional latch mechanisms may be utilized to maintain the side thrust generators 84 into their down positions.

Figure 15:
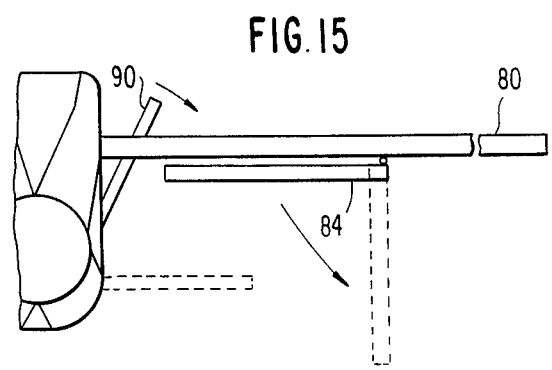

As shown in FIG. 14, the horizontal stabilizers of the tail section may be pivoted downwardly from the stored position into the position illustrated in FIGS. 7 and 15.

Figure 16:
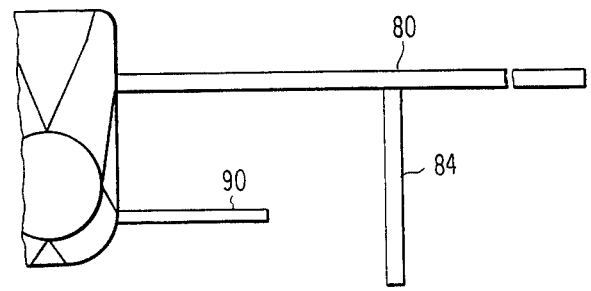
Figure 17:
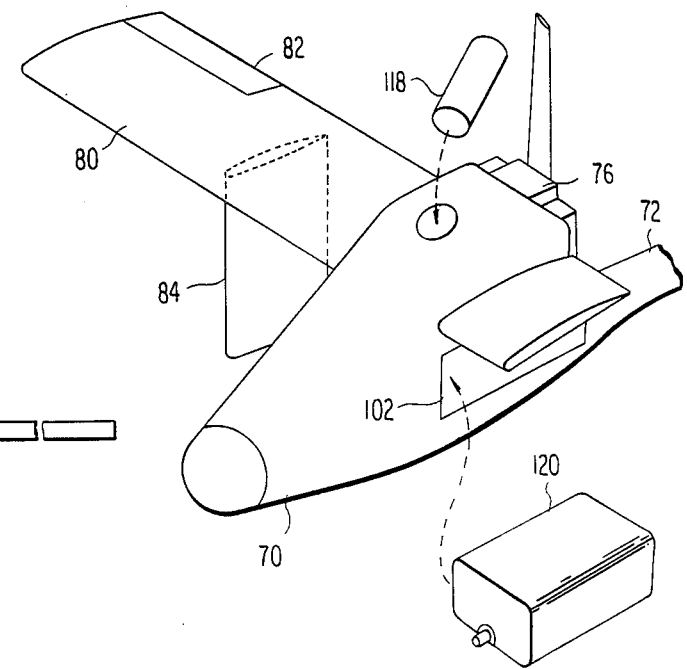
FIG. 17 is a pictorial view of the aircraft of the present invention showing the installation of ordnance and fuel cell.

Once the aircraft has been uncrated and erected, the screw cap 86 may be removed and ordnance package 118 from remote storage inserted into the nose portion 70 as shown in FIG. 16. In addition and as also shown in FIG. 16, a removable fuel cell 120 from remote storage may be inserted into the recess 102 in the nose portion 70 to provide a predetermined amount of fuel for the aircraft.

Once the aircraft has been provided with fuel, it may be electrically powered by a cable from the truck of FIG. 1 to the quick connect/disconnect plug 108 illustrated in FIG. 10. Appropriate diagnostics may be run on the avionics contained within the aircraft at that time by way of other cables and the same plug to suitable conventional equipment contained within the truck. At this time, but not necessarily in sequence, the flight profile controller of the aircraft guidance system may be programmed in any suitable conventional manner and the aircraft engine started in preparation for a launch. The umbilical cord from the truck may then be removed leaving the aircraft in position on the base member 32 of the crate 22 ready for launch from the rail 30 as illustrated in FIG. 1.

The insertion of a suitable conventional solid fuel rocket from remote storage into the recess 98 of the base member of the crate 22, and the ignition thereof, will serve to launch the base member 32 and the aircraft from the rail. Desirably, the rocket will extinguish before the base member 32 leaves the rail and the base member 32 will be detached from the aircraft in any suitable conventional manner to fall away under the force of gravity leaving the aircraft in propeller driven flight under control of the flight profile controller in the guidance system.

In operation, the aircraft will fly during the initial portion of the flight under the control of the flight profile controller using any suitable conventional guidance system to approach the expected proximity of a target. Once in the expected proximity of a target, the aircraft may be made to loiter at a predetermined altitude by any conventional station keeping maneuver. While not necessary, it is expected that the aircraft in this initial portion of its flight will be guided in the conventional roll-to-turn maneuvers, assisted in part by the presence of the side force generators. Once in place over the desired target area, the electromagnetic wave energy sensor in the nose of the aircraft may be activated to sense the presence of a target. The guidance system may be programmed to react in predetermined ways in response to the loss of a target, e.g., abort and loiter, and is designed to home on the energy being emitted by the target.

In the terminal dive portion of the flight of the aircraft, the aircraft is designed to operate solely in a yaw-to-turn mode. As explained in connection with FIG. 18, the directional finder or D.F. sensor 104 in the nose portion of the aircraft may provide in a conventional manner suitable azimuth signals, AZ, and elevation signals, EL. This raw data may be combined in a suitable conventional aircraft attitude compensation circuit 130 with information from the yaw rate gyro 134 and the pitch rate gyro 136 respectively to provide LOS AZ and LOS EL signals. The signal LOS AZ represents the true line of sight of the target with respect to the aircraft velocity vector. Similarly, the pitch rate gyro 136 and the EL signal are used to calculate the LOS EL signal which represents the line of sight of the target with respect to the aircraft velocity vector.

Both the LOS AZ and the LOS EL signals are differentiated in the differentiator 140 to obtain the LOS rate data necessary to a "proportional" guidance system in which the rate of change of the azimuth line of sight signals and the elevation line of sight signals are maintained at zero to achieve a target hit.

Figure 18:
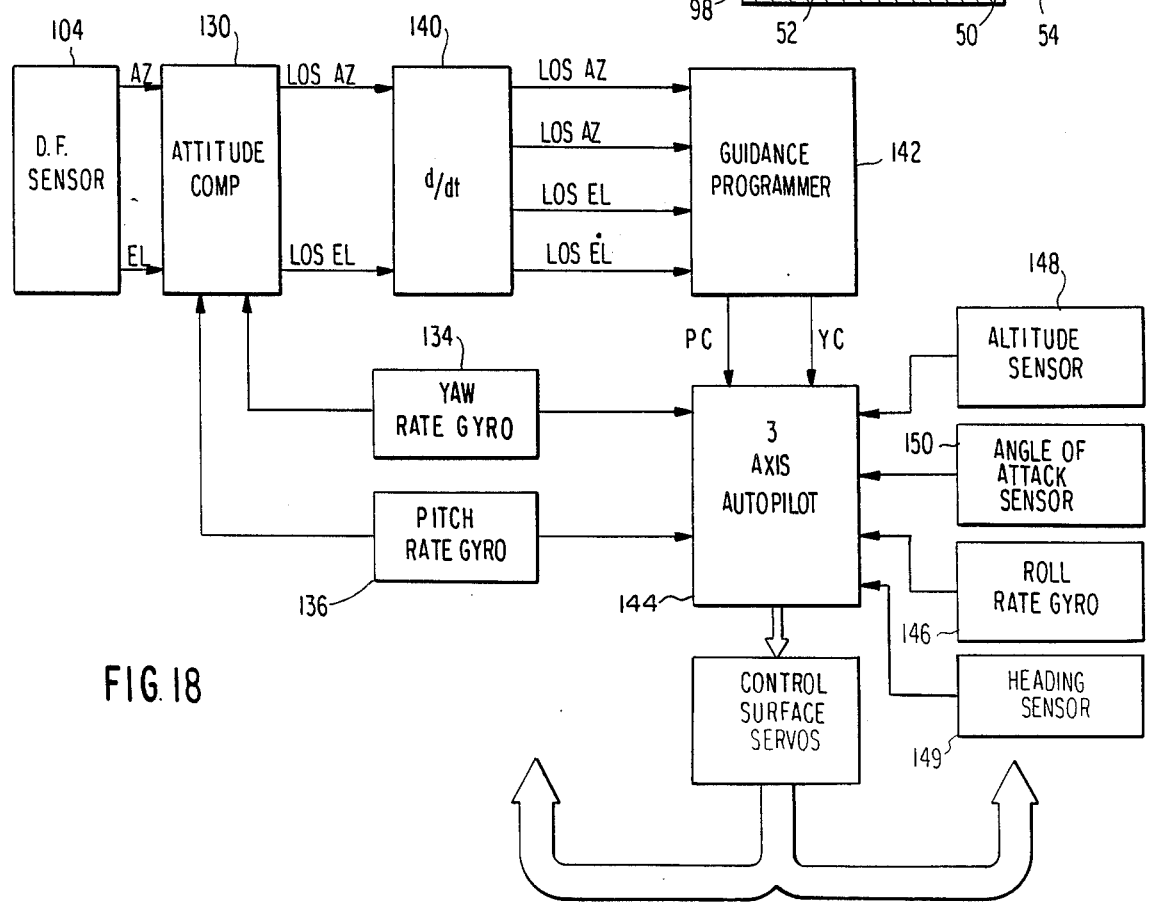
FIG. 18 is a functional block diagram of the terminal dive maneuver guidance system of the present invention.

With continued reference to FIG. 18, the guidance programmer 142 contains the logic for beginning and for aborting the terminal dive, monitoring the status of the direction findings sensors 104 output signals and passing the pitch command and yaw command signals PC and YC respectively to the conventional three axis autopilot 144. A conventional roll rate gyro 146, and altitude sensor 148, a heading sensor 149 and an angle of attack sensor 150 also provide input signals for the autopilot 144.

During the terminal dive maneuver, the throttle of the engine is desirably commanded to idle and the aircraft is permitted to attain any velocity or attitude which will drive the line of sight rate signals provided by the differentiator 140 to zero. The three mutually orthogonal rate gyros 134, 136, and 146 are aligned with the velocity vector of the diving aircraft in the same manner as the sensor 104 is aligned. The alignment of the yaw and pitch rate sensors with the aircraft's velocity vector provide rate data which may be directly utilized by the aircraft stabilizing circuitry within the three axis auto pilot 144 without the differentiation or attitude compensation necessary when a vertical gyro is used.

Moreover, the use of a rate gyro in the roll circuit to maintain a zero roll rate of the aircraft about its velocity vector does not constrain the vehicle to a zero roll attitude, i.e., wings level with the horizon. Whereas the use of the vertical gyro to maintain roll attitude would force the wings level at all times, the ability of the aircraft to change its roll angle while maintaining a zero roll rate permits the aircraft to follow the most direct path to the target regardless of variations in the initial attack geometry and wind. In addition, the use of a roll rate gyro renders the guidance insensitive to vehicle attitude and the terminal dive may be completed in vertical or inverted flight. A significantly greater hit probability is thus obtained.

In addition to providing zero roll rate, the autopilot 144 may provide short period pitch and yaw damping through inner stabilization loops as they seek to null the pitch rate and yaw rate signals for the sevro motors driving the control surfaces of the aircraft.

To insure miminum cross coupling, the zero roll rate circuitry is used to activate the ailerons of the wings only, and the pitch and yaw circuits are connected to the elevator and rudder controls respectively. It is desirable that the yaw/roll coupling of the aircraft be kept as low as possible because each control loop perturbates the other control loops in seeking to null its own error signals. Such cross coupling may result in excessive servo movement.

The creation of side force during a yaw maneuver may be accomplished as a practical matter with vertical airfoil sections equal in area to 0.2 to 0.5 of the aircraft's wing area. This generates a side force of at least 1.0 g which has been found satisfactory.

It is important to an understanding of the terminal dive portion of the aircraft that the aircraft may adapt a change in roll without a change in roll rate. For example, a change in the pitch of the aircraft prior to the yawing thereof will produce a roll aircraft attitude with respect to the horizon, i.e., the wing will not be level, but the aircraft will not have experienced a change in its roll rate. By operating in a yaw-to-turn mode, the necessity for correcting pitch and yaw error signals caused by rotation of the aircraft about its longitudinal axis is, thus, eliminated.

ADVANTAGES AND SCOPE OF INVENTION

The system of the present invention is advantageous in many respects.

By way of example, the guidance system of the aircraft is less expensive through the elimination of a vertical gyro. In addition, the use of a "proportional" guidance system in the terminal dive produces a greater hit probability even with inaccurate sensors. So long as the actual sensor error is relatively constant, the maintenance of a zero rate of change will provide a hit.

The system of the present invention is also uniquely configured for safety, with the aircraft, its fuel, its ordnance and its rocket propulsion system separately stored.

The system is rapidly deployable and the unique crate and rail assembly provide for rapid positioning for launch. The configuration of the aircraft also minimizes storage space and minimizes the time needed for erection.

These and many other advantages will be readily apparent to one skilled in the art from the claims. It should be understood that the foregoing description of a preferred embodiment is illustrative only, and that many modifications may be made without departing from the spirit thereof as defined in the claims when accorded a full range of equivalents.

We claim:

1. A system for guiding an expendable pilotless aircraft to an electromagnetic wave energy emitting target comprisng:
    an aircraft having control surfaces asymmetrical in the pitch and yaw planes, a sensor, and a guidance system operative in the terminal portions of the flight of the aircraft in a yaw-to-turn mode with a substantially zero roll rate; and
    rapidly deployable aircraft launching means.

2. The system of claim 1 wherein said guidance system comprises:
    a directional sensor for providing azimuth and elevation error signals;
    means for providing guidance signals indicative of the rate of change of said azimuth and elevation signals;
    a guidance programmer responsive to said guidance signals for providing pitch control and yaw control signals;
    an altitude sensor for providing an altitude control signal;
    an angle of attack sensor;
    roll, pitch and yaw rate gyros for providing rate control signal; and
    a three axis autopilot responsive to said control signals for controlling the control surfaces of said airframe.

3. A guidance system for an expendable pilotless aircraft having an airframe with control surfaces comprising:
- a directional sensor for providing azimuth and elevation error signals;
- means for providing guidance signals indicative of the rate of change of said azimuth and elevation signals;
- a guidance programmer responsive to said guidance signals for providing pitch control and yaw control signals;
- an altitude sensor for providing an altitude control signal;
- an angle of attack sensor;
- roll, pitch and yaw rate gyros for providing rate control signals; and
- a three axis autopilot responsive to said control signals for controlling the control surfaces of said airframe.

4. A method for guiding an expendable pilotless aircraft to an electromagnetic wave energy emitting target comprising the steps of:
- (a) providing an aircraft having control surfaces asymmetrical in the pitch and yaw planes, an electromagnetic energy sensor, and a guidance system;
- (b) controlling the flight of the aircraft in the initial portion of the flight of the aircraft in accordance with a predetermined program;
- (c) sensing the difference between the longitudinal axis of the aircraft and the line-of-sight to detected electromagnetic wave energy in the pitch and yaw planes with a maximum error between about seven degrees and about ten degrees; and
- (d) controlling the flight of the aircraft in the terminal portion of the flight of said aircraft in a yaw-to-turn mode with a substantially zero yaw roll rate.

5. A method for guiding an expendable pilotless aircraft to an electromagnetic wave energy emitting target comprising the steps of:
- (a) launching an aircraft having control surfaces asymmetrical in the pitch and yaw planes;
- (b) sensing an electromagnetic wave energy emitting target; and
- (c) controlling the flight of the aircraft in response to the sensing of the electromagnetic wave enregy in a yaw-to-turn mode with a substantially zero roll rate.

6. A system for guiding an expendable pilotless aircraft to a target comprising:
- an aircraft having control surfaces about the pitch and yaw axis and a guidance system operative to turn said aircraft in the terminal portions of the flight of the aircraft by yawing the aircraft without effecting any substantial roll rate; and
- rapidly deployable aircraft means.

7. The system of claim 6 wherein said aircraft includes a removable fuel cell and a removable ordnance; and
- wherein said aircraft launching means includes a removable solid fuel rocket,
- whereby said aircraft may be positioned on said launching means prior to the attachment of said fuel cell, said ordnance and said rocket.

8. A system for guiding an expendable pilotless aircraft to an electromagnetic wave energy emitting target comprising:
- an aircraft having control surfaces generally symmetrical about the roll axis, asymmetrical about the pitch and yaw axis, an electromagnetic wave energy detector, and a guidance system operative in a first position of the flight of the aircraft in resonse to predetermined data in a roll-to-turn mode and operative in a second portion of the flight of the aircraft in response to the detection of electromagnetic wave energy in a yaw-to-turn mode; and
- rapidly deployable aircraft launching means.

9. The system of claim 8 wherein said aircraft includes a removable fuel cell and a removable ordnance; and
- wherein said aircraft launching means includes a removable solid fuel rocket,
- whereby said aircraft may be positioned on said launching menas prior to the attachment of said fuel cell, said ordnance and said rocket.

10. A system for guiding an expendable pilotless aircraft to an electromagnetic wave energy emitting target comprising:
- an aircraft having control surfaces about the pitch and yaw axis, means for sensing electromagnetic wave energy, and a guidance system operative in the termial portions of the flight of the aircraft in response to said sensing means to turn the aircraft without any substantial roll rate; and
- rapidly deployable aircraft launching means.

11. The sytem of claim 10 wherein said aircraft includes a removable fuel cell and a removable ordnance; and
- wherein said aircraft launching means includes a removable solid fuel rocket,
- whereby said aircraft may be positioned on said launching means prior to the attachment of said fuel cell, said ordnance and said rocket.

12. A method for guiding an expendable pilotless aircraft to an electromagnetic wave energy emitting target comprising the steps of:
- (a) providing an aircraft having control surfaces symmetrical about the roll axis and asymmetrical about the pitch and yaw axis, an electromagnetic energy sensor, and a guidance system;
- (b) controlling the flight of the aircraft in a first portion of the flight of the aircraft in a mode which includes substantial roll rate in effecting a turn in accordance with a predetermined program;
- (c) senisng the difference between the longitudinal axis of the aircraft and the line-of-sight to detect electromagnetic wave energy in the pitch and yaw planes with a maximum error between about seven degrees and about ten degrees; and
- (d) controlling the flight of the aircraft in a second portion of the flight of the aircraft in response to said sensed differences in a mode which includes a substantially zero roll rate in effecting a turn.

13. A method for guiding an expendable pilotless aircraft to an electromagnetic wave enregy emitting target comprising the steps of:
- (a) providing an aircraft having control surfaces about the pitch and yaw axis, an electromagnetic energy sensor, and a guidance system;
- (b) controlling the flight of the aircraft in an initial portion of the flight of the aircraft in accordance with a predetermined program;
- (c) sensing the difference between the longitudinal axis of the aircraft and the line-of-sight to detect electromagnetic wave energy in the pitch and yaw planes; and (d) controlling the yawing of the aircraft in the terminal portion of the flight of said aircraft without inducing any substantial yaw roll rate.

14. A method for guiding an expendable pilotless aircraft to an electromagnetic wave energy emitting target comprising the steps of:
   (a) launching an aircraft having control surfaces about the pitch and yaw axis;
   (b) sensing an electromagnetic wave energy emitting target; and
   (c) controlling the flight of the aircraft about the yaw axis in response to the sensing of the electromagnetic wave energy without indicing any substantial roll rate.

15. The method of claim 14 wherein said aircraft is readied for launch by the steps of:
   (a) inserting a removable fuel cell into the aircraft;
   (b) inserting a removable ordnance into the aircraft; and
   (c) programming the aircraft for the initial portion of its intended flight.

16. A method for guiding an expendable pilotless aircraft to an electromagnetic wave energy emitting target comprising the steps of:
   (a) launching an aircraft having control surfaces about the pitch and yaw axis;
   (b) sensing an electromagnetic wave energy emitting target; and
   (c) turning the aircraft in response to the sensing of the electromagnetic wave energy by yawing the aircraft without rolling the aircraft.

17. The method of claim 16 wherein said aircraft is readied for launch by the steps of:
   (a) inserting a removable fuel cell into the aircraft;
   (b) inserting a removable ordnance into the aircraft; and
   (c) programming the aircraft for the initial portion of its intended flight.

18. A method for guiding an expendable pilotless aircraft to an electromagnetic wave energy emitting target comprising the steps of:
   (a) launching an aircraft having control surfaces about the pitch and yaw axis;
   (b) sensing an electromagnetic wave energy emitting target; and
   (c) yawing the aircraft in response to the sensing of the electromagnetic wave energy without rolling the aircraft.

19. The method of claim 18 wherein said aircraft is readied for launch by the steps of:
   (a) inserting a removable fuel cell into the aircraft;
   (b) inserting a removable ordnance into the aircraft; and
   (c) programming the aircraft for the initial portion of its intended flight.

* * * * *